Jan. 8, 1957  A. G. SANGSTER  2,777,109
SERVO POSITIONING MECHANISM
Filed May 18, 1951  6 Sheets-Sheet 5

Inventor:
Arlon G. Sangster
Munroe H. Hamilton
Attorney

Jan. 8, 1957 A. G. SANGSTER 2,777,109
SERVO POSITIONING MECHANISM
Filed May 18, 1951 6 Sheets-Sheet 6
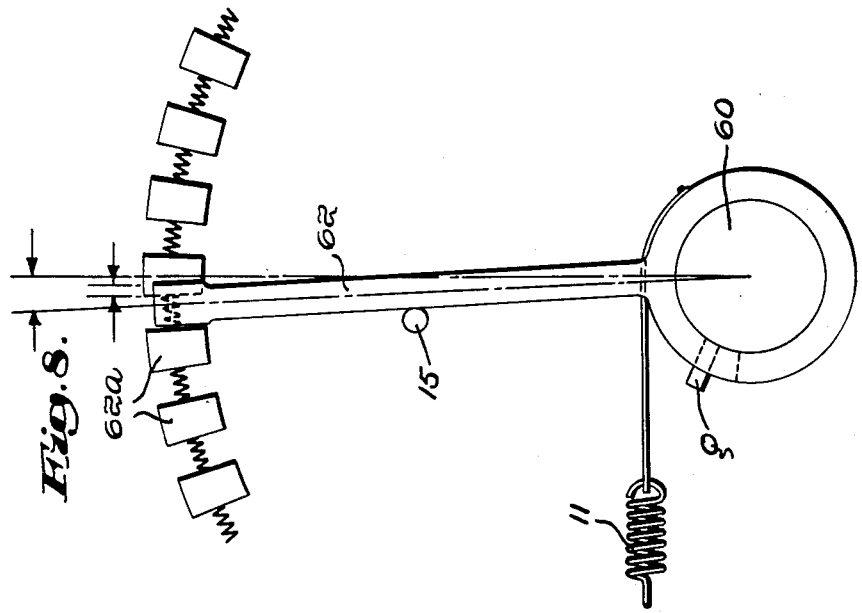
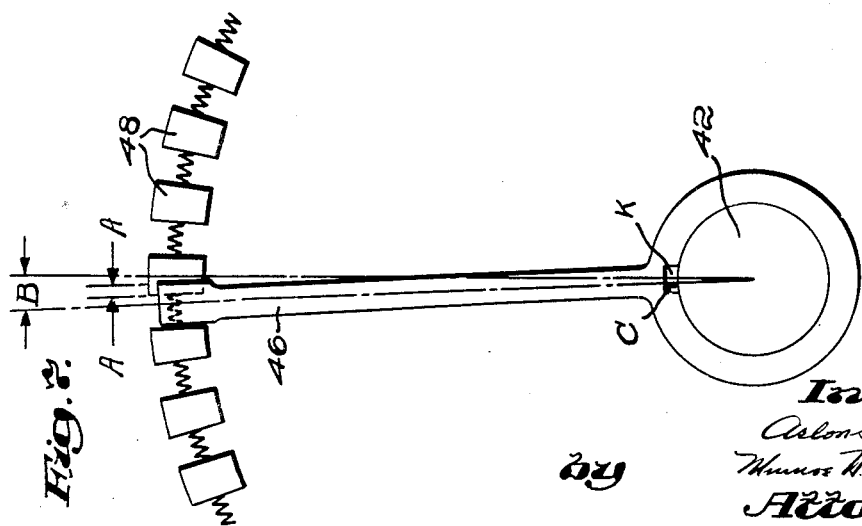

United States Patent Office 2,777,109
Patented Jan. 8, 1957

2,777,109

SERVO POSITIONING MECHANISM

Arlon G. Sangster, Leominster, Mass.

Application May 18, 1951, Serial No. 226,986

13 Claims. (Cl. 323—66)

This invention relates to an electro-mechanical positioning apparatus for automatically setting and operating various classes of machines, such as machine tools and other types of mechanisms.

It is an object of the invention to provide an improved control apparatus of the general class indicated, and especially to devise an apparatus which is capable of carrying out exceedingly accurate settings of precision machines, such as machine tools. Another object of the invention is to provide a control apparatus which can be operated to carry out a series of machine operating steps in a predetermined manner and in conjunction with accurate positioning or setting of the work pieces which are to be operated upon by the tool. Still another object is the provision of means for duplicating the intelligence of a master device, thereby reducing manual labor and time required in hand operations of a similar nature.

These and other objects and novel features will be more fully understood and appreciated from the following description of a preferred embodiment of the invention selected for purposes of illustration and shown in the accompanying drawings, in which:

Fig. 7 is an elevational view of another form of rheostat apparatus shown in Fig. 5; and Fig. 8 is still another elevational view of the rheostat apparatus shown in Fig. 6.

Figure 4:
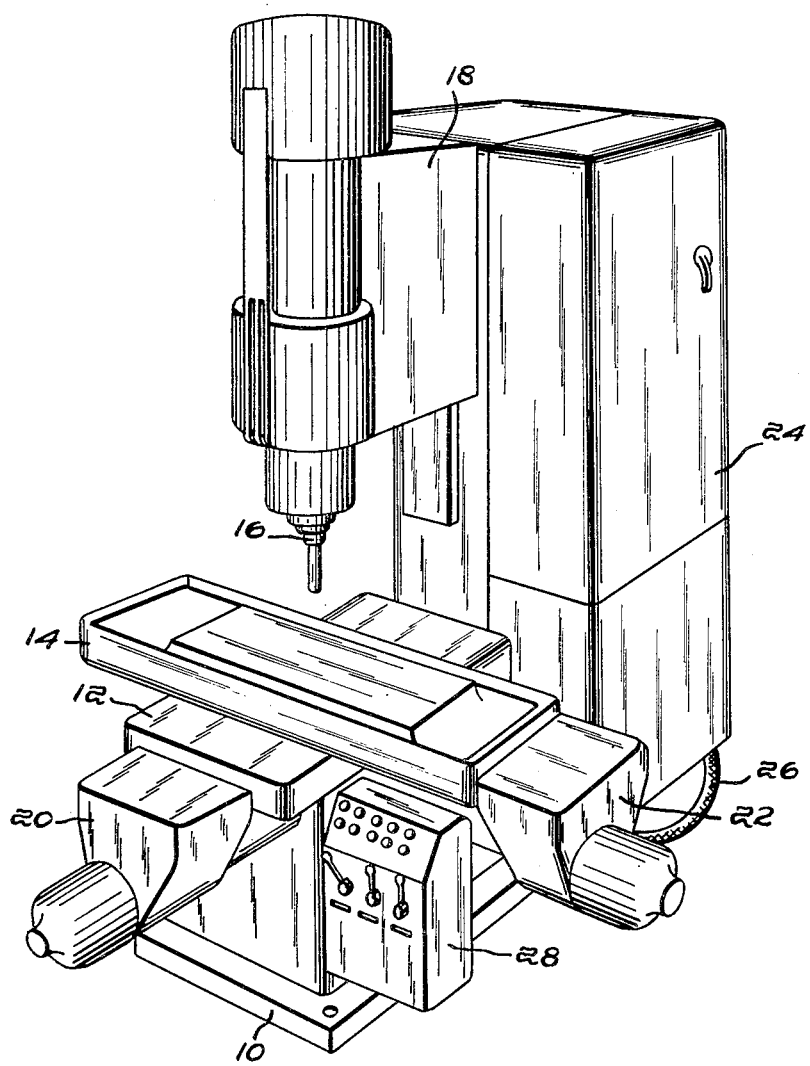
Fig. 4 is a perspective view of a machine tool illustrating one form of the apparatus of the invention combined therewith.

In the drawings the invention has been illustrated in one preferred form applied to a tool of the type commonly referred to as a "jig borer." As illustrated in Fig. 4, the jig borer includes a base 10 on which is mounted work supporting slides 12 and 14 which are adapted to be moved back and forth in order to correctly locate a work piece secured thereon in some desired position of register with a spindle 16 carried in a spindle bracket 18 of the tool.

In accordance with the invention there are provided several parts of an electro-mechanical control apparatus located in close proximity to the machine and in a position chosen so that the slidable work table sections may be driven thereby. In thus specifically applying the apparatus to the movable slides it should be understood that the invention is not necessarily limited thereto and may also be employed to control raising and lowering of the spindle 16, as well as performing various other operations.

The electro-mechanical apparatus in the form shown in Fig. 4 comprises two driving mechanisms separately housed in casings 20 and 22 (Fig. 4). The electrical circuits and means for operating this driving mechanism may conveniently be received within a housing 24 forming a part of the bracket 18 at the rear side of the jig borer. Numeral 26 denotes diagrammatically suitable wiring connections running from the electrical control apparatus in housing 24 to the driving mechanism indicated by numeral 22. In a similar manner, the driving mechanism 20 may be electrically connected to a corresponding form of electrical control apparatus. The driving mechanism and its electrical control apparatus is further governed by a master device which may conveniently take the form of a punched tape or card to be located in an electrical switch unit 23 secured along one side of the base of the jig borer, as noted in Fig. 4.

Figure 5:
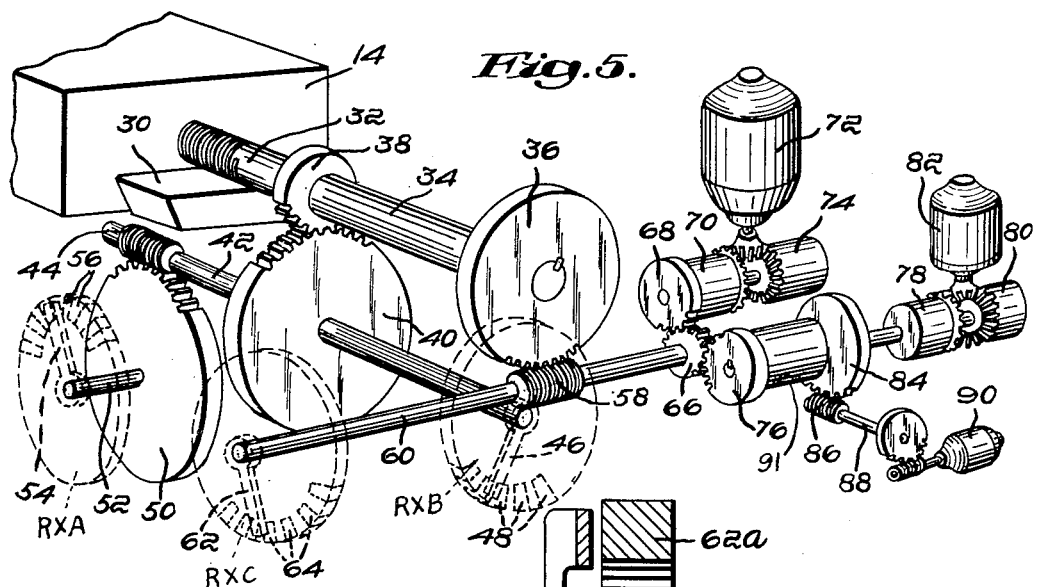
Fig. 5 is a perspective view illustrating diagrammatically driving mechanism engaged in moving the work table of the machine tool shown in Fig. 4.

A description of one of the driving mechanisms will serve to properly describe the construction of the apparatus shown in the drawings and reference is had particularly to the driving mechanism in unit 22 of which the component parts have been illustrated somewhat diagrammatically in Fig. 5. As noted in that figure, the component parts of the driving mechanism have been shown completely removed from the protective casing shown in Fig. 4, and for purposes of simplifying the disclosure, no attempt has been made to illustrate the detailed bearings and supporting brackets in which this mechanism is mounted. For this purpose it is intended that any conventional type of shaft bearing and bracket arrangement may be employed.

Considering this driving mechanism in greater detail, it will be seen that the work table member 14 is slidably mounted on a dove-tail 30, and threaded into one end of the member 14 is a lead screw 32. The latter member projects outwardly to form a shaft portion 34 and at the end of which is fixed a gear 36. Intermediate the shaft and lead screw is another smaller gear 38 in mesh with a gear 40 independently mounted for rotation on a shaft 42 supported in the casing 22, the bearings for which are not shown.

At one end of the shaft 42 there is provided a worm 44, and at the opposite end of the shaft there is provided a rheostat unit consisting of a commutator arm 46 bearing a rheostat brush which is adapted to move into and out of contact with rotary movement of the arm 46 around a series of rheostat blocks 48 mounted in some convenient manner in spaced relation about the extremity of the shaft 42 in the casing 22. No attempt has been made to illustrate the specific mounting of the rheostat bars as it is intended that any one of various conventional rheostat bar assemblies may be utilized and attached by a suitable supporting means within the casing 22. Preferably the rheostat bars will be employed in units of 100 each.

Figure 6:
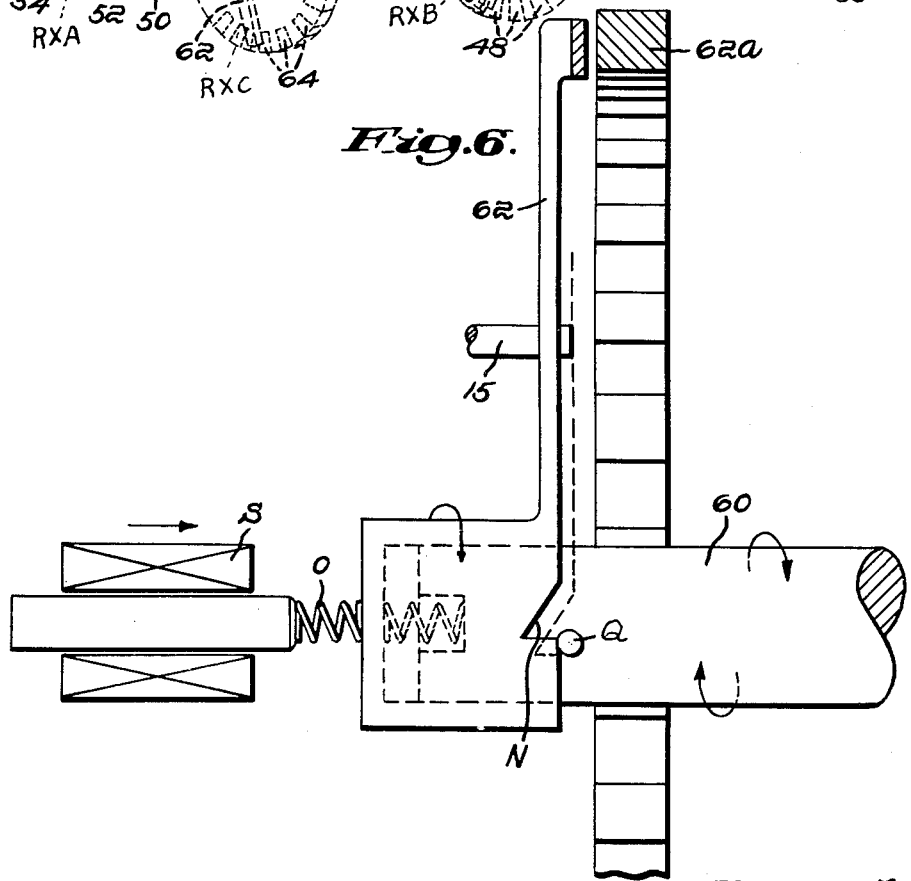
Fig. 6 is an enlarged, fragmentary, side elevational view of a rheostat mechanism, also shown in Fig. 5.

In mesh with the worm 44 on shaft 42 is another gear 50 fixed to a shaft 52 which, as was the case with shaft 42, is suitably mounted within the casing 22 at either end thereof. The extremity of shaft 52 carries a rheostat arm 54 which is adapted to move into and out of contact with rheostat bars 56, as has been diagrammatically indicated at the left-hand side of Fig. 5. In mesh with the gear 36 is still another worm 58 on a shaft 60 also supported in the casing 22 and bearing at its outer extremity a third rheostat arm 62 which is adapted to move axially into and out of contact with rheostat bars 64, as illustrated in Figs. 6 and 8.

A gear 66 on shaft 60 meshes with a gear 68 driven by a right-hand magnetic clutch member 70, in turn operated through suitable pinion gears by a driving motor 72. A second magnetic clutch 74, when energized, will reverse the rotation of shaft 60 through the gear 66. Similarly, a gear 76 is driven in a clockwise direction by a magnetic clutch member 78 and in a counterclockwise direction by a magnetic clutch 80 through an electrical motor 82. Between the gear 76 and magnetic clutch 78 is located a gear 84 which meshes with a worm 86 on a shaft 88, in turn connected by gears with another driving motor 90. Gear 84 is attached to gear 76 by a clutch 91.

With the several motors and the gearing and shafting described, it will be seen that the member 14 may be advanced or retracted by means of either one of the motors 72 and 82 and at differing speeds, corresponding to the speed ratings of these two motors. Similarly, the lead screw 32 may be advanced in one direction only by means of the motor 90. In each case the motors are assumed to be normally in an operative running condition with control of the magnetic clutches either connecting or disconnecting the motors in driving relationship with the respective gears and shaft.

An important feature of the invention is the use of a series of progressively large gear ratios so that not only may the lead screw be driven at varying speeds and in either direction, but it may also be stopped in a great many positions of adjustment, thus lending an extremely desirable flexibility to the device. For example, shaft 52 may be geared to shaft 42 through a ratio of 100–1 and shaft 42 may be geared to shaft 60 through a ratio of 100–1. Therefore, for 100 inches of travel of the work table, shaft 52 makes one full turn and since its commutator has 100 bars, each bar represents one inch of travel. In the same fashion shaft 42 represents one inch per full turn and each brush represents .010 inch of table travel. Shaft 60 represents .010 inch per full turn and each of the commutator bars represents .0001 inch of table travel. It can be readily seen, therefore, that by stopping each of these shafts in any of 100 available positions, one may stop the table within .0001 in 100 inches. Each commutator is actually 100 bars covered by resistances having equal value. The zero bar is connected to the circuit and the brush is the other circuit connection. Therefore, by rotating the brush arm one has a resistor having 100 stops.

The electrical means employed to energize the magnetic clutches for motors 72 and 82, as well as the means for energizing directly the motor 90 will now be described.

Figure 1:
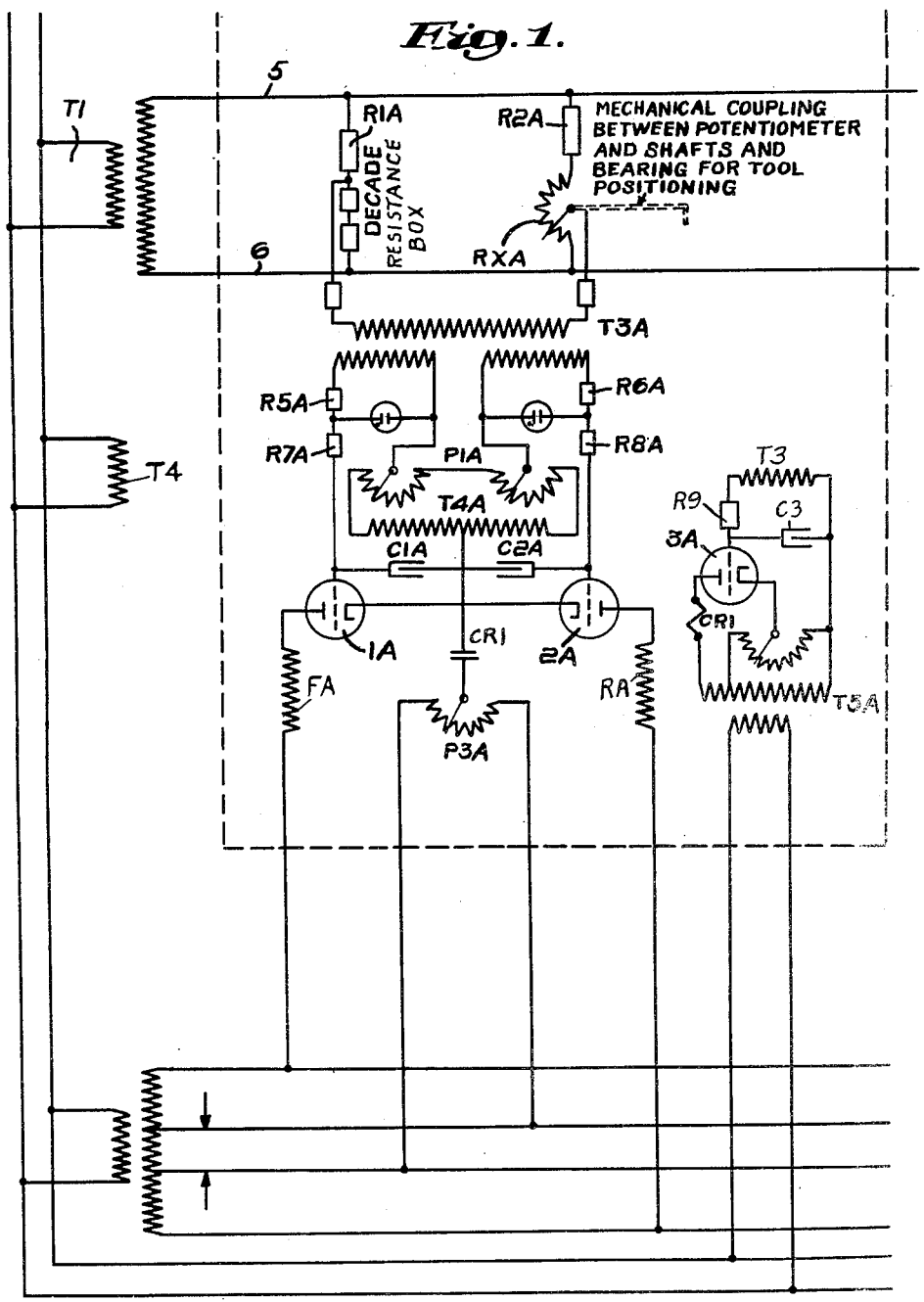
Figs. 1, 2 and 3 are composite parts of a single wiring diagram comprising three units or stages of which the unit illustrated in Fig. 2 should be understood as being electrically connected at the right-hand side of the unit shown in Fig. 1, while the unit shown in Fig. 3 is connected to the right-hand side of the unit in Fig. 2.

Attention is directed to Fig. 1 of the drawings in which it will be seen that power is supplied from a line indicated at the left-hand side of that figure through a bridge supply transformer T1. A sinusoidal voltage of, for example, 500 volts is applied to a series combination of resistors 5 and 6, including a fixed resistor R1A of 45 ohms and a decade resistor having a maximum resistance of 5000 ohms. This voltage is also applied through a series combination including a 45,000 ohm fixed resistor R2A and a 5000 ohm potentiometer RXA. The potentiometer is mechanically coupled to the driven device, i. e., the table 14, in such a way that each physical position of the work table 14 corresponds to a particular position of the potentiometer arm.

Figure 2:
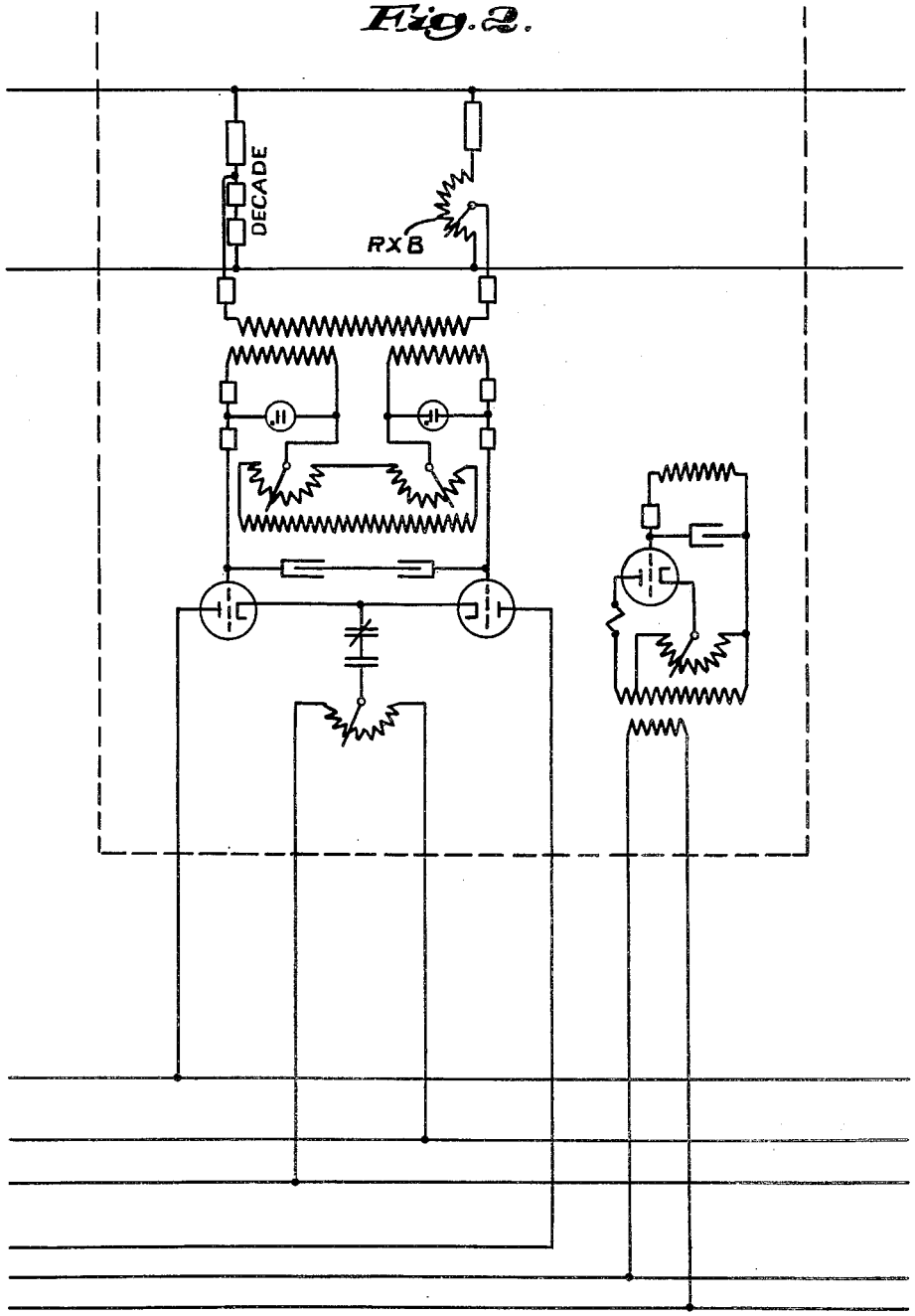
Figure 3:
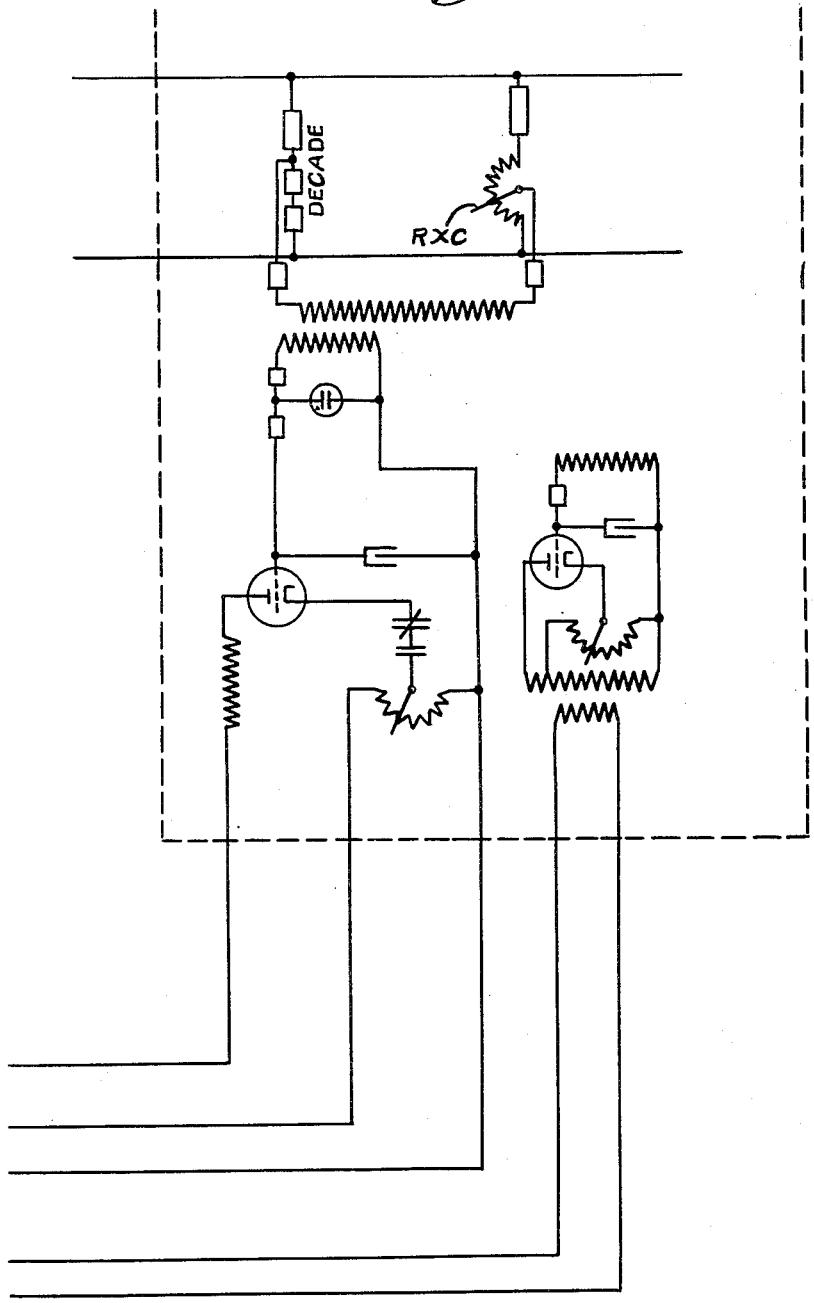

As will be apparent from an inspection of Figs. 2 and 3, the above described arrangement is repeated in each of the units shown in these figures and each unit has a potentiometer arm located on a respective shaft in the gear train and drive mechanism shown in Fig. 5. For purposes of illustration it has been assumed that the potentiometer arm of potentiometer RXA corresponds to arm 54 on shaft 52 in Fig. 5. Likewise potentiometer RXB of Fig. 2 may correspond to arm 46 on shaft 42 and potentiometer RXC corresponds to arm 62 on shaft 60.

Having reference again to Fig. 1, it is pointed out that the magnetude and phase relation of the voltage between the junction of the fixed resistance R1A and the decade resistance box, and the junction of the fixed resistance R2A and the potentiometer RXA will depend on the value of the resistance of the decade box and the position of the arm on the potentiometer RXA.

This voltage is impressed on the primary of the grid transformer T3A. This transformer has three separate secondary windings. The voltage induced in two of these windings is impressed through a network on the grids of two gas filled rectifier tubes 1A and 2A. This network consists of resistors R5A and R6A and a gas filled discharge device designed to limit this voltage to reasonable maximum values, as shown in Fig. 1. The network further includes resistors R7A and R8A, as well as capacitors C1A and C2A which serve to prevent false firing of the rectifier tubes due to transient voltages induced on either the anode or the grid circuit. Also, in the grid circuit is a source of sinusoidal voltage T4A and the means of adjusting its magnetitude consisting of tandem operated potentiometer P1A. The cathodes of the rectifier tubes 1A and 2A are connected together, as shown. This point is connected through relay contacts CR1 to a potentiometer 3PA connected across a source of 25 volts.

The potentiometer P1A allows a variable voltage to be impressed on the grids of the gas filled rectifier tubes 1A and 2A whose instantaneous polarity is 180° out of phase with that of the voltage applied to the anodes of the tubes.

The potentiometer P3A in the cathode circuit allows the relative cathode to anode voltage of the rectifier tubes to be altered in such a manner as to increase this voltage on one tube and simultaneously decrease the anode voltage on the other in order to balance differences in tube characteristics.

If the voltage applied to the primary of transformer T3A induces a secondary voltage greater than bias voltage T4A, the resultant voltage will be applied to the grids of the rectifier tubes. One tube will have both a positive grid voltage and a positive anode voltage. This tube will "fire," energizing the magnetic clutch in its anode circuit. In this particular instance it will be the clutch which is controlled by shaft 2 and arm 54 of the potentiometer. Firing of the tube will cause the driven device, through its magnetic clutch, to move the bridge potentiometer RXA to a position in which the voltage applied to the primary of transformer T3A is reduced to a minimum and approaches zero.

The voltage induced in the third secondary on transformer T3A is applied to the grid of the vacuum tube 3A. This voltage is, however, opposed by a predetermined voltage from transformer T5A. If the secondary voltage of T3A is less than the predetermined voltage from T5A, this tube will not conduct and relay CR1 will be energized.

This will take place as the servo mechanism comes into correspondence, and it will be noted that the normally open contact on CR1 will prevent any further operation of the magnetic clutches on unit A. However, the additional contact connected in unit B will close, thus allowing unit B to operate in a manner similar to unit A. When unit B is in correspondence, unit C will be energized. Unit C provides travel in one direction only.

It is pointed out that it is possible by automatic determination of the voltage in the circuit to run the motors, and hence the rheostat arms, in such a way as to reduce or increase voltage and thus always maintain a uniform voltage in the bridge circuits. It will be apparent, therefore, that by closing combinations of switches in the decade resistance box, either manually or by means of a punched card or tape, we can position the respective arms of each stage in any one of 100 positions corresponding to the 100 rheostat bars employed in the drawings, utilizing only a small number of switches.

The control unit 28, suggested in Fig. 4 of the drawings, represents one suitable switching arrangement comprising a switch box into which punched cards, for example, may be introduced. These cards will be so punched as to provide for closing a number of circuits in some desired sequence corresponding to the desired settings for the machine which may be necessary in carrying out a given tool positioning and work piece setting operation.

It should also be appreciated that in the mechanism described and illustrated in Fig. 5, driven as it is by gears and a lead screw, there will be developed a certain amount of back lash. Since this back lash might defeat the objective of accurate positioning, the invention further includes means for ensuring that the effects of back lash are absorbed and the final approach to any position is in one direction only. In accordance with the invention, means are provided for causing the brushes of two of the arms to come to rest in a desired position of relationship with respect to a respective engaged rheostat bar and, in addition, means are provided for specifically controlling movement of the third rheostat arm which makes the last fine adjustment in setting the work table.

Attention is directed to Fig. 7 in which is shown a key arrangement for holding the arm 46 on shaft 42 wherein a key portion K fixed on the shaft 42 is located in spaced relation to one side of a keyway formed in the arm hub in order to provide a clearance C. A similar construction is provided with respect to arm 54 and shaft 52. With shaft 42 turning clockwise, the arm 46 trails an angular amount C. When the leading edge of the arm contacts the left-hand edge of the central contact 48, the condition is satisfied to stop the motor but the mechanism coasts a little, i. e. the amount A—A which is easily determined. At this precise point, the center line of the shaft 42 is precisely in line with the center point of the central contact 48, which was desired.

The arm 46 is not so located, but need not be, as it is the position of shaft 42 that is important to the accuracy of the device, and the precise size of C is determined by how much off center arm 46 is relative to the center line of contact 48, as an angular measurement.

The distance C is calculated so that it is the same regardless of the direction of rotation of the shaft, so that the width of both the arm 46 and contact 48 have to be related in a certain way, as the angular measurements B, C, and A—A are all inter-related.

Unlike arms 46 and 54, the arm 62 is driven by its shaft 60 in a somewhat different manner so that movement is limited to one direction only. For this purpose the arrangement shown in the drawings at Figs. 6 and 8 has been devised. As noted therein arm 62 is free on shaft 60 being normally held out of engagement by a spring P. A solenoid S, when energized, forces the arm inwardly against the spring and in one position of the shaft 60 a notch N in the arm hub engages over a pin Q transversely projecting from the shaft. When this engagement is effected, the arm 62 is rotated by the driven shaft 60 and moves about the bars 62a in one direction only, as has been indicated by the arrow in Fig. 6.

As soon as the potentiometer for the respective bridge circuit, namely potentiometer RXC, satisfies the required demand for balancing voltage, the solenoid is automatically de-energized and the arm becomes disengaged and pulled back by a spring 11, Fig. 8, against a stop 15.

As an example of one specific positioning operation using the apparatus of the invention, let it be assumed that it is desired to stop at a position represented by the value 12.3456″. This means that shaft 52, Fig. 5, will have to rotate from a zero turn position to a position represented by 12¾₁₀₀ of a turn. To effect this there is introduced into the control member 28 a punched card which will close a circuit requiring for balance a voltage adjustment of 88 units. This will cause motor 72 to move the table 14 in the proper direction until the unbalanced voltage has been satisfied, at which point the table will be somewhere between 12 and 13 inches from the end of its travel. Due to the design of the brush back lash it can be expected that the precise point of stopping will occur between 12.250 and 12.750.

The second stage on shaft 42 is then positioned by motor 82 to 33, rather than 34, this compensation being introduced permanently into the electrical resistances, which means that the table now is between .3325 and .3375 in the second stage. When the third stage is ready to position, solenoid S, Fig. 6, is energized and motor 90 rotates in a clockwise direction. When shaft 60 has rotated to its zero position the spring O in front of the solenoid S forces the brush arm to the right, as viewed in Fig. 6, into contact with the first bar on rheostat 62a.

The rheostat arm 62 is now turned clockwise until it reaches a position representing the value 56, when it will come to rest. The solenoid is, at this point, de-energized and the brush arm is disengaged. Spring 11 then returns the arm to its starting position against the pin 15.

Similarly, various other sequential positioning or setting operations may be carried out in great number by use of properly punched cards or tapes. It should be understood, also, that a plurality of setting operations may be carried out in conjunction with one another, either in connection with a machine tool, such as has been described above, or with respect to various other types of mechanical equipment where an automatic operation is found to be desirable.

It will be evident from the foregoing description that the apparatus of the invention provides a rapid and accurate positioning means adapted to many types of mechanical operations, and that there is included in this apparatus a number of specific novel features which make the device practical and efficient to employ, especially the use of specific gear ratios and controls for operating the rheostat units in the desired sequence, as well as the mechanism for stopping the rheostat arms, and in the case of one of these arms, limiting its movement to rotation in one direction only.

While I have shown a preferred embodiment of the invention, it is intended that various changes and modifications may be resorted to in keeping with the scope of the invention as defined by the appended claims.

Having thus described my invention, what I desire to claim as new is:

1. A device as described in claim 9, in which two of the commutator arms are loosely connected to their respective shafts with a back lash clearance and at least one of the arms has its end fixed to its respective shaft, and means limiting movement of the fixed arm to rotation in one direction only.

2. A structure as defined in claim 1, in which said arm limiting means includes a stop member located in the path of movement of the limited arm and a spring for normally holding the arm against the stop.

3. A device of the character described, including a driven device and an electrical net work including a bridge circuit for controlling the driven device, said electrical net work including a commutator mechanism having a bar and a commutator arm, the arm being mounted on a shaft with a slight relative rotational motion with respect thereto, so as to increase accuracy in positioning the shaft relative to the commutator bar, a motor to rotate the shaft, and said bar and arm being arranged to stop the operation of the motor upon central contact.

4. An apparatus of the class described, comprising a driven device, an electrical network including a plurality of bridge circuits, variable resistor means for producing a difference in potential in the bridge circuit, power driven means responsive to change in potential in the bridge circuit for locating the driven device in desired positions of adjustment, said power driven means including a reversible rotating shaft member having a key portion fixed thereon, a commutator arm received on the key portion of the shaft and rotatable therewith, said arm having an enlarged keyway for engaging loosely over the said key portion of the shaft, a commutator brush element supported at the end of the commutator arm, a plurality of commutator bars mounted around the said shaft in position to be engaged seriatim by the said brush, said enlarged keyway presenting a clearance so chosen as to provide for rotating the shaft in one direction ahead of the arm and locating a center line of the shaft in coincident relationship to the central axis of a commutator bar in any position at which the commutator arm comes to rest.

5. An apparatus of the class described, including a driven device, an electrical network, a power driven mechanism under the control of the electrical network to vary the position of the driven device, said power driven mechanism including a reversible rotating shaft, a commutator arm mounted on the shaft for rotation therewith, a commutator brush element on the arm, a plurality of commutator bars mounted around the shaft in a position to be contacted by the brush at substantially equal spaced-apart intervals, said commutator arm and shaft being operatively connected in loosely keyed relationship to provide a limited degree of circumferential movement for locating the shaft when at rest in a desired poistion of register with respect to the said commutator bar contacted by the arm, said degree of circumferential movement being a function of the area of contact of the brush with the commutator bar resulting from the brush coming into contact with the bar from either direction and coasting to a stop.

6. A structure as defined in claim 5, and further including another shaft rotatable in one direction only, a motor for the last-named shaft, said motor being responsive to movement of the said second shaft and being operatively connected to the driven device.

7. A structure as defined in claim 5, including a second loosely keyed shaft and commutator arm assembly and a third shaft rotatable in one direction only, said one directional shaft being connected directly to the driven device.

8. A structure as defined in claim 7, in which the one directional shaft is connected to the driven device by means of screw threads.

9. An electro-mechanical control apparatus for automatic machine operation comprising electrical network including a plurality of bridge circuits, variable resistor means for producing a difference in potential in the bridge circuits, magnetic clutch means, electronic switching devices responsive to change in potential in the bridge circuits to energize the clutch means in a predetermined manner, driving mechanism operated by the clutch means, a driven device operatively connected to the driving mechanism, potentiometer means mechanically coupled to the driving means so as to be moved thereby into positions producing balanced voltage conditions in the bridge circuit, said driving mechanism including a lead screw secured to the driven device, a main driving shaft connected to the lead screw, and a plurality of independently driven shafts connected to the main driving shaft for locating the driven device in varying positions of adjustment, a commutator arm on each shaft, and a commutator brush on each arm, a plurality of commutator bars mounted around each of the shafts in a position to be engaged by the respective brushes, one or more of the commutator arms being loosely secured to their respective shafts with a back lash clearance between the arm and the shaft, said clearance being so chosen as to cause the center line of a shaft to normally stop in a posiiton of register with respect to the center line of a respective commutator bar with which the brush carried by the arm is engaged.

10. A positioning mechanism comprising a lead screw, a plurality of means to selectively and separately drive the lead screw to different degrees of adjustment of the object being positioned in either direction as called for by a predetermined condition, and uni-directional means to drive the lead screw in one direction only and providing the final step in the positioning of the object.

11. A positioning mechanism comprising a lead screw, a plurality of means to selectively and separately drive the lead screw at different degrees of adjustment of the object being positioned in either direction as called for by a predetermined condition, and uni-directional means to drive the lead screw in one direction only and providing the final step in the positioning of the object, means to stop the uni-directional means during operation of any of the plurality of means, and means to start the uni-directional means upon cessation of the last operation of the plurality of means.

12. A positioning mechanism comprising a device to be positioned and including a lead screw operably connected thereto for that purpose, an electrical network for controlling driving means for the lead screw, a plurality of driving means for the lead screw to drive the same for periods according to a predetermined plan at different rates of speed, said network comprising a commutator mechanism for each driving means including a commutator arm and a series of commutator bars past which the arm is swept by each said driving means separately, and control means to throw each driving means out of action as its commutator arm reaches a predetermined commutator bar, said driving means all being geared to the lead screw.

13. A positioning mechanism comprising a device to be positioned and including a lead screw operably connected thereto for that purpose, an electrical network for controlling driving means for the lead screw, a plurality of driving means for the lead screw to drive the same for periods according to a predetermined plan at different rates of speed, said network comprising a commutator mechanism for each driving means including a commutator arm and a series of commutator bars past which the arm is swept by each said driving means separately, and control means to throw each driving means out of action as its commutator arm reaches a predetermined commutator bar, said driving means all being geared to the lead screw and an automatic clutch to throw the last driving means out of gear while the previous driving means are operating and into gear upon cessation of the previous driving means.

References Cited in the file of this patent

UNITED STATES PATENTS

| | | |
|---|---|---|
| 474,623 | Andrews | May 10, 1892 |
| 719,018 | Leonard | Jan. 27, 1903 |
| 1,592,193 | Farnsworth | July 13, 1926 |
| 1,654,867 | De Laval | Jan. 3, 1928 |
| 1,962,335 | Wensley | June 12, 1934 |
| 2,020,275 | Bears | Nov. 5, 1935 |
| 2,342,717 | Yardeny | Feb. 29, 1944 |
| 2,411,763 | Swingle et al. | Nov. 26, 1946 |
| 2,436,172 | Kent | Feb. 17, 1948 |
| 2,467,454 | Arnot | Apr. 19, 1949 |
| 2,494,922 | Yardeny | Jan. 17, 1950 |
| 2,510,707 | Markusen | June 6, 1950 |
| 2,594,716 | Bailey | Apr. 29, 1952 |

FOREIGN PATENTS

| | | |
|---|---|---|
| 585,091 | Great Britain | Jan. 30, 1947 |